United States Patent [19]

Jahn

[11] 3,977,294

[45] Aug. 31, 1976

[54] COMPOSITE ARMOR AND METHOD

[75] Inventor: Paul F. Jahn, Chelmsford, Mass.

[73] Assignee: Fiber Materials, Inc., Biddeford, Maine

[22] Filed: Sept. 7, 1971

[21] Appl. No.: 178,335

[52] U.S. Cl. ................................... 89 36 A; 109/80; 427/365; 428/252; 428/408; 428/911; 156/182
[51] Int. Cl.² .......................................... F41H 5/00
[58] Field of Search.................... 89/36 A; 252/478; 161/170, 182, 213, 404; 117/121, 160, 169; 109/80

[56] References Cited
UNITED STATES PATENTS

| | | | |
|---|---|---|---|
| 2,372,607 | 3/1945 | Schwarzkopf...................... | 89/36 A |
| 2,987,488 | 6/1961 | Clark .................................. | 252/478 |
| 3,110,571 | 11/1963 | Alexander........................... | 89/36 A |
| 3,231,521 | 1/1966 | Sturges et al. ...................... | 252/478 |
| 3,431,818 | 3/1969 | King................................... | 89/36 A |
| 3,516,898 | 6/1970 | Cook .................................. | 89/36 A |
| 3,592,942 | 7/1971 | Hauck et al. ....................... | 89/36 A |
| 3,634,177 | 1/1972 | Glaser................................. | 89/36 A |
| 3,702,593 | 11/1972 | Fine...................................... | 161/404 X |

*Primary Examiner*—Stephen J. Lechert, Jr.
*Attorney, Agent, or Firm*—Schiller & Pandiscio

[57] ABSTRACT

A composite laminate material is described comprising a plurality of layers of graphite sheet material coated on at least one side thereof with a ceramic material having a density greater than about 50% of its theoretical density, preferably, up to about 95% or greater theoretical density. The ceramic material constitutes at least 90% of the thickness of the composite laminate. The composite laminate is formed by applying to one or both sides of graphite sheet material a ceramic layer compacted to at least 50% theoretical density. A plurality of layers of the ceramic coated graphite sheets are then stacked and pressure molded by conventional techniques with the various layers being adhered together using a suitable adhesive. The resulting laminate is light weight and thin but has sufficient strength to be used as armor material to protect against projectiles. The laminate material is easily shaped and cut and because of its light weight is especially useful for making body armor.

17 Claims, 2 Drawing Figures

COMPOSITE ARMOR AND METHOD

This invention relates to a novel composite laminate material and to a method of manufacturing the same, and more particularly to an improvement in light weight armor and to a method of manufacturing the same.

Armour plate is used for various protective purposes, primarily for reducing exposure of military or law enforcement personnel, or political figures, from small arms fires. In order to be effective, the armor must be capable of stopping or decelerating bullets or other projectiles within an extremely short distance; and, in order to be effective or worthwhile as a protective vest, the material must be both light-weight and flexible.

Various types of armor are known in the art. The earliest type of armor was metal armor. While armor made of metal is capable of protecting against flying fragments and missles, such as bullets and the like, metal armor has the disadvantage that it is very heavy and therefore is unsuitable or undesirable in many applications where weight is critical; and moreover, metal armor is expensive to fabricate and shape. Additionally, metal armor does not provide flexibility. Furthermore, metal armor has the disadvantage that it is bulky and is thus easily detected.

In order to overcome some of the disadvantages of the metal armor, the art turned to the use of ceramic materials. While such materials may be light weight and can be fabricated into flexible shapes, such materials have presented substantial manufacturing problems.

Current methods of producing armor from ceramic materials include hot pressing, reaction or diffusion sintering, and controlled shrink sintering.

In hot pressing, ceramic powders are subjected to high heat and pressure within refractory dies to form a desired shape. Such method has the disadvantage in that it requires a special facility which involves a substantial investment, typically many millions of dollars. Also, such method is only a batch process and as such is uneconomical from a commercial standpoint.

In reaction or diffusion sintering a ceramic powder is mixed with a suitable filler, cold pressed to about 50% of theoretical density and thereafter reacted with various gases in a reaction retort. A major disadvantage of this means of production is that it is limited to use with only a few refractory species such as SiC and $B_4C$. Also such method is only semi-continuous, and it also requires substantial investment in a special facility.

In controlled shrink sintering, a shaped partially densified ceramic body is densified to a few percent pore volume by exposure to high temperature. While such method can be run as a continuous process and is therefore the most economical of the current methods of producing armor from ceramic materials, such method has a major disadvantage in that it cannot be used with boron carbide which is the lightest weight of the commonly used ceramics. Thus armor made by this method must be made with other ceramics which are substantially heavier than armor made with boron carbide, and therefore such armor, like metal armor, is unsuitable or undesirable in many applications where weight is critical.

A principal object of the present invention is, therefore, to provide for a light weight, flexible material which is inexpensive to produce.

Yet another object of the present invention is to provide a method for producing economically a high density ceramic material which is light weight and which can be used to form a light weight armor material capable of shielding from an armor piercing bullet or other projectile.

Other objects of the present invention will, in part, be obvious and will, in part, appear hereinafter. The invention accordingly comprises the product possessing the features, properties and the relation of components, and the process including the several steps and the relation of one or more of such steps with respect to each of the others, all of which are exemplified in the following detailed disclosure and the scope of the application of which will be indicated in the claims.

To effect the foregoing and other objects, the invention generally involves a composite laminate comprising a plurality of layers of graphite sheet material, each of said layers of graphite material being coated on at least one side thereof with a ceramic material having a density greater than about 50% of its theoretical density, preferably up to about 95% or greater theoretical density, and bonded together to form a composite laminate, the ceramic material constituting at least 90% of the thickness of the composite laminate.

The laminate material is produced by applying to one or both sides of graphite sheet material a ceramic layer compacted to greater than about 50% theoretical density, preferably up to about 95% or greater theoretical density. The resulting coated graphite sheets are then stacked and bonded together using a suitable adhesive and pressure molded by conventional techniques.

For a fuller understanding of the nature of and objects of the present invention, reference should be had to the following drawings wherein.

Figure 1:
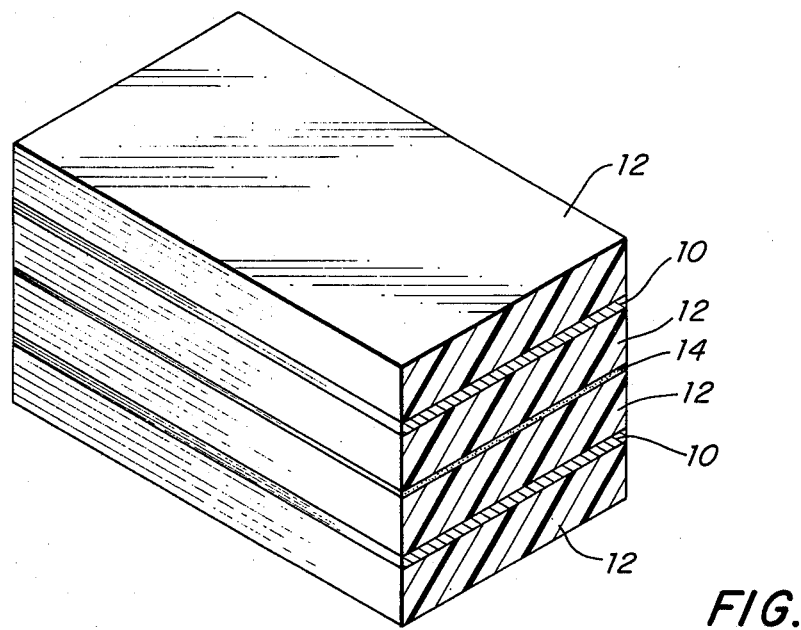
FIG 1 is a view of a laminate structure of the present invention.

In FIG. 1, numeral 10 indicates a thin graphite sheet material having adhered to both sides thereof layers 12 of a compacted high density ceramic material. Successive layers of ceramic material coated graphite sheets are bonded together by adhesive layer 14.

Figure 2:
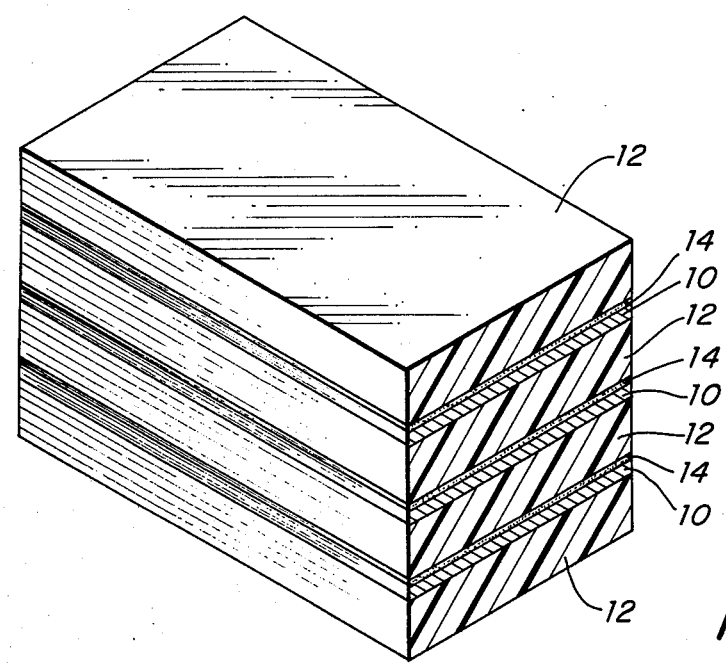
FIG. 2 is a view of another laminate structure of the present invention.

In FIG. 2 the graphite sheet layers 10 are shown to each carry only a single layer of ceramic material 12. Successive layers of ceramic coated graphite sheets are bonded together by adhesive layers 14.

While in the drawings only a few individual laminate elements are shown, it is understood that the number of laminates forming the armor material may be varied widely. Ordinarily, for armor designed to protect against a 30-caliber armor piercing projectile at a distance of about 10 yards the laminate will be composed of at least about 30 layers of ceramic coated graphite sheet.

The graphite sheet material can be any graphite sheet material such as graphite ribbon, graphite cloth, or graphite tape. Preferably the graphite sheet material is thin, and preferably not substantially greater than about 5 mils. Especially preferred are graphite materials having a thickness of not more than about 0.5 – 1 mil.

The compacted ceramic layers must comprise together at least about 90% of the thickness of the composite laminate. When the graphite layer is coated on both sides by ceramic material, each ceramic layer could be approximately the same thickness, or one layer can be thicker than the other layer. There is no maximum limitation on the thickness of the ceramic material other than one of practicality; that is, if the ceramic material coatings are too thick, the resulting laminate armor material will be thick and heavy and not better than the prior art metal armor. Preferably, however, the ceramic material will be a thickness which will yield on compacting to at least 50% theoretical density, and preferably up to about 95% or greater theoretical density, a coated graphite sheet at least having a thickness of at most between about 10–20 mils, and a composite product comprising at least about 95% compacted ceramic material in thickness.

The ceramic material can be any ceramic material known in the art. Typically the ceramic material will be an oxide of boride of aluminum, molybdenum, tantalum, thorium, titanium tungsten, zirconium and the like, or a carbide of aluminum, boron, molybdenum, tantalum, thorium, titanium, tungsten, zirconium and the like. If desired, a plurality of different ceramic materials can be used in the laminate. Especially preferred, however is boron carbide because of its light weight.

The adhesive can be any adhesive known in the art for bonding ceramic materials such as one of the well known epoxy resins. The type of adhesive used is not critical to the present invention. The only requirement is that it can bond the ceramic material. The adhesive layer is typically as thin as possible, preferably only a few tenths of a mil in thickness.

An advantage of the present invention is that the composite laminate material can be produced in a continuous process using equipment commonly found in industry. The present invention thus provides for the first time an economical method of producing armor material. Another advantage is that ceramic materials which are compacted according to the process of the present invention have a lower weight per unit volume then the corresponding ceramic compacted by prior art means. For example, boron carbide compacted by the process of the present invention to 95% theoretical density weighs about 5% less than monolithic hot pressed boron carbide of corresponding theoretical density.

In preparing the laminate product a graphite sheet material is coated on one, or both sides with a ceramic slip such as an aqueous slurry of the chosen ceramic material. The coating operation is accomplished using known techniques and equipment normally found in industry, e.g. a knife coater. The slip is then dryed in air, or in an oven, to form a tenacious film of the graphite sheet material. The dried, coated sheet material is then compacted into a high density, thin ceramic sheet by continuously hot rolling, typically at a pressure between about 200 and 1000 psi and a temperature between about 1000°C and about 2000°C, for sufficient time to compact the ceramic material to at least 50% theoretical density. Preferably the ceramic material is compacted to about 95% to 98% theoretical density.

The resulting ceramic material-coated graphite sheet is then cut into a desired shape and coated with an adhesive. A plurality of layers are stacked and pressure molded together. Typically from about 20 to 30 layers will be stacked and pressure molded into a single composite material. Alternatively the armor material can be cut into the desired shape, e.g., human torso shape, after fabrication using known cutting equipment. The following example illustrates the manufacture of the armor material of this invention. This example is presented solely for illustration and should not be regarded as limiting the invention.

EXAMPLE

A. A slurry is prepared by mixing 30 parts of powdered boron carbide in 100 parts of a sodium silicate water solution. This slurry is then applied to a 0.3 mil graphite ribbon. The coating is air dried at 200°F to procude a tenacious film having a thickness of about 50 mils.

The coated graphite ribbon is then hot rolled at 1900°C under pressure of 1000 psi to produce a high density film having a thickness of about 10 mils.

B. A 0.2 mil coating of epoxy resin was applied to one side of the composite ribbon of part (A) and the ribbon was cut into 30 equal size pieces using case hardened shears. The 30 pieces of composite ribbon were stacked and pressure molded under 200 psi pressure and 300°F temperature to form a composite laminate material having a thickness of about 0.35 inches. The composite laminate material weighed about 5 lbs per square foot.

The composite laminate material prepared as above was backed with a 0.25 inch thick fiberglass backing. The fiberglass backed composite laminate material was tested against a 30-caliber armor piercing projectile at a distance of 10 yards at 0° of obliquity, and was found to effectively stop the projectile. The fiberglass backing material itself was also tested against a 30-caliber armor piercing projectile under similar conditions, and was found to not stop the projectile.

Obviously, many modifications and variations of the present invention are possible in light of the foregoing teachings. It is to be understood, therefore, that the invention is not limited in its application to the details of construction and arrangement of parts specifically described or illustrated and that within the scope of the appended claims, it may be practiced otherwise then as specifically described or illustrated.

What is claimed is:

1. A composite laminate material comprising a plurality of layers of graphite sheet material each having adjacent at least one side thereof a layer of ceramic material having a density greater than about 50% of its theoretical density, said ceramic material constituting at least about 90% of the thickness of the composite laminate.

2. A composite material comprising a laminate of a plurality of layers of graphite sheet material each having a thickness of not substantially greater than about 5 mil, and having adjacent at least one side thereof a layer of ceramic material having a density greater than about 50% of its theoretical density, said ceramic material constituting at least about 90% of the thickness of said composite laminate.

3. Composite laminate as in claim 1 wherein the graphite sheet material comprises graphite cloth having a thickness of about up to 15 mils.

4. Composite laminate as in claim 1 wherein the graphite sheet material comprises a graphite filament tape having a thickness of up to about 5 mils.

5. Composite laminate as in claim 1 wherein the ceramic material has a density of greater than about 95% of its theoretical density.

6. Composite laminate as in claim 2 wherein the ceramic material has a density of greater than about 95% of its theoretical density.

7. Composite laminate as in claim 2 wherein the ceramic material comprises at least about 95% of the thickness of the composite laminate.

8. Composite laminate as in claim 1 wherein the composite laminate comprises not less than 20 layers of graphite sheet material.

9. Composite laminate as in claim 1 wherein the ceramic material is selected from the group consisting of a boride of aluminum, molybdenum, tantalum, thorium, titanium, tungsten, and zirconium; a carbide of aluminum, boron, molybdenum, tantalum, thorium, titanium, tungsten and zirconium; and an oxide of aluminum, molybdenum, tantalum, thorium, titanium, tungsten and zirconium, mixtures thereof.

10. Composite laminate as in claim 2 wherein the graphite sheet material comprises graphite ribbon having a thickness of up to about 0.5 mils.

11. Composite laminate as in claim 2 wherein the laminate comprises between not less than 20 layers of graphite sheet material.

12. Composite laminate as in claim 2 wherein the ceramic film comprises a boride of aluminum, molybdenum, tantalum, thorium, titanium, tungsten, and zirconium; a carbide of aluminum, boron, molybdenum, tantalum, thorium, titanium, tungsten and zirconium; and an oxide of aluminum, molybdenum, tantalum, thorium, titanium, tungsten and zirconium, and mixtures thereof.

13. A method of preparing a composite laminate material of the type herein described constituting at least about 90% thickness ceramic, comprising the steps of (1) applying to at least one surface of a graphite sheet material a layer of ceramic material; (2) compacting said layer of ceramic material to at least about 50% theoretical density by hot rolling said ceramic material coated graphite sheet; and (3) laminating a plurality of compacted ceramic material-coated graphite sheets of suitable thickness to form the desired laminate.

14. A method as in claim 13 wherein said hot rolling is effected at a pressure between about 200 and 1000 psi and at a temperature between about 1000° and 2000°C.

15. A method as in claim 14 wherein said hot rolling is effected for a time sufficient to compact said ceramic materials to about 95% to 98% theoretical density.

16. A method as in claim 13 including the steps of coating a graphite sheet material with a ceramic slip, drying said slip, and hot rolling said coated sheet at a pressure between about 200 and 1000 psi and a temperature of between about 1000° and 2000°C to form said coated graphite sheet material.

17. A method as in claim 16 wherein said hot rolling is effected for a time sufficient to compact said ceramic material to about 95% to 98% theoretical density.

* * * * *